United States Patent Office 3,702,339
Patented Nov. 7, 1972

3,702,339
PROCESS FOR MANUFACTURING β-AMINOCARBOXYLIC ACID DERIVATIVES AND/OR THE CORRESPONDING α,β-UNSATURATED CARBOXYLIC ACID DERIVATIVES
Herbert Eck and Joseph Heckmaier, Burghausen, Upper Bavaria, Helmut Prigge, Munich, and Hellmuth Spes, Burghausen, Upper Bavaria, Germany, assignors to Wacker-Chemie G.m.b.H., Munich, Bavaria, Germany
No Drawing. Filed Oct. 1, 1968, Ser. No. 764,297
Claims priority, application Germany, Oct. 3, 1967, P 16 43 568.0
Int. Cl. C07c *101/12*
U.S. Cl. 260—482 R     6 Claims

ABSTRACT OF THE DISCLOSURE

Process for manufacturing β-aminocarboxylic acid derivatives of the general structure $$R-CH-CH_2COOR'$$
$$|$$
$$NR'R''$$

and the corresponding α,β-unsaturated carboxylic acid derivatives of the general structure

R—CH=CH—CO—OR′ which comprises reacting compounds of the general formula $$R-CH-OR'$$
$$|$$
$$NR'R''$$

with ketene, where, in the above formulas
R=H, phenyl residues,
R′, R″=alkyl residue with 1–4 C-atoms.

BACKGROUND OF THE INVENTION

It is known that β-aminocarboxylic acid derivatives are obtained by adding secondary amines to acrylic acid derivatives. Acrylic acid esters are, for example, prepared by adding ketene to acetals and by the pyrolysis of the resulting β-alkoxycarboxylic acid esters. This work method requires a number of process steps.

SUMMARY OF THE INVENTION

We have now discovered a process by which it is possible to obtain from compounds of the general structure $$R-CH-OR'$$
$$|$$
$$NR'R''$$

with ketene, if necessary in the presence of acid, neutral or basic catalysts, inert solvents and other additives, and at temperatures ranging between −100 and +150° C., preferably between −80 and +100° C., under reduced, normal or elevated pressures, in gaseous or liquid phase, either continuously or discontinuously β-aminocarboxylic acid derivatives of the general formula $$R-CH-CH_2-CO-OR'$$
$$|$$
$$NR'R''$$

and/or the corresponding α,β-unsaturated carboxylic acid derivatives of the general structure

R—CH=CH—CO—OR′

In these formulas:
R=H, aryl residue,
R′, R″=alkyl residue, 1–4 C-atoms

If necessary, the α,β-unsaturated carboxylic acid esters can be converted by the known method into the corresponding β-aminocarboxylic acid derivatives.

When R represents an aryl residue, α,β-unsaturated carboxylic acid esters almost exclusively are formed.

When R=H, the result is mostly mixtures in which each time following the reaction and recovery conditions and following the kind of other substituents, the β-aminocarboxylic acid esters or the esters of the corresponding α,β-unsaturated carboxylic acid predominate.

For example (dimethylamino-methyl)-methyl ether, (diethylamino-methyl)-methyl ether, (dibutylamino-methyl)-methyl ether, (methylphenylamino-methyl)-methyl ether, (diethylamino-methyl)-butyl ether, (dimethylamino-methyl)-hexyl ether, (dimethylamino-benzyl)-methyl ether, are suitable as compounds of the structure $$R-CH-OR'$$
$$|$$
$$NR'R''$$

Mineral acids like phosphoric acid, difluorophosphoric acid, hexafluorophosphoric acid, sulphuric acid or Friedel-Crafts catalysts like boron fluoride, zinc chloride, aluminum chloride, iron chloride, are suitable as acid catalysts.

Suitable neutral catalysts are tertiary alkyl titanates like tertiary butyl titanate, sodium chloracetate. Sodium acetate, trialkylamines like triethylamine, tribenzylamine, pyridine, quinoline may serve as alkaline reactive catalysts.

The catalysts are inserted in the concentration of 0.05 to 5%, referred to the starting material.

This method work can be performed either continuously or discontinuously, either in a gaseous or in a liquid phase. In order to perform the reaction all the inert solvents like ether, dibutyl ether, chlorinated hydrocarbons like for instance methylene chloride, trichlorethylene, chlorinated tetracarbons, chlorobenzene and dichlorobenzene hydrocarbons like benzene, toluene, petroleum ether, cyclohexane, furthermore carboxylic acid esters like acetic acid ethyl ester, silicon tetraalkylate—are all suitable.

The process is feasible at normal, high and low pressures. Excess pressure, usually ranging no more than 10 atmospheres, is usually applied in the case of less reactive compounds, while low pressure is only used in case the production of ketene requires it. If so, it is not advisable to apply a vacuum higher than 10 mm. of the mercury column because otherwise the throughput in the production of ketene will become too low. It is recommended to work with an excess of ketene of 0.1 to 4, preferably 1 to 2, mols.

The products manufactured according to our invention are suitable, for example, as plant protective agents as well as for the manufacture of pharmaceutically effective substances and plastics.

DESCRIPTION OF THE PREFERRED EMBODIMENTS

Example 1

50 g. of (diethylaminomethyl)-methyl ether were dissolved in 150 ml. of methylene chloride and then treated in an autoclave with 35 g. of ketene at a temperature of −45° C. whilst cooling. The reaction time lasted 10 hours. The course of reaction of this as well as of all the following examples is exothermic. The following products were isolated by fractional distillation in a vacuum:

11 g. of acrylic acid methyl ester, boiling point (200 mm. Hg)=47° C.

17 g. of β-diethylaminopropionic acid methyl ester, boiling point (11 mm. Hg)=74° C. 7 g. of N,N-diethylacetamide.

Example 2

35 g. of ketene were fed into a solution of 50 grams (diethylamino-methyl)-butyl ether and 1 g. of tertiary butyl titanate in 150 ml. toluene at 100° C. within an hour, and the reaction mixture was then fractionated in vacuum. Besides 6 g. of N,N-diethylacetamide 12 g. of acrylic acid butyl ester, boiling point (11 mm. Hg)=42° C., 14 g. β-diethylaminopropionic acid butyl ester, boiling point (0.2 mm. Hg)=49° C. where obtained.

Example 3

Hourly 42 g. of ketene are continuously converted with a solution of 50 g. (diethylaminomethyl)-butyl ether in 150 ml. methylene chloride at a temperature of —70° C. Thereby, every hour 51 g. of the following mixture are manufactured:

6.5% diethylamine, 16% butylacrylate, 6.5% N,N-diethylacetamide, 70% β-diethylaminopropionic acid butyl ester, and
1% β-diethylaminopropionic acid diethylamide. The evaluation was done by gas chromatograph.

Example 4

42 g. of ketene at a temperature of 30° C. were passed within one hour through a solution of 50 g. (dimethylaminobenzyl) methyl ether and 0.1 g. of zinc chloride in 150 ml. methylene chloride. The fractional distillation yielded 20 g. of dimethylacetamide, and
25 g. of cinnamic acid methyl ester, boiling point (11 mm. Hg)=127° C.

Example 5

When a solution of 50 g. (dimethylamino-benzyl) butyl ether was treated with 35 grams of ketene at —45° C., the result was 20 g. dimethylacetamide, and
24 g. cinnamic acid butyl ester, boiling point (11 mm. Hg)=148° C. The duration of the reaction was one hour.

Example 6

35 g. of ketene cooled to —45° C. were fed within one hour into a solution of 50 g. di-(ethylamino-) methane in 150 ml. of methylene chloride. The fractional distillation resulted in 8 g. N,N-diethylacetamide,
1 g. acrylic acid diethylamide, and
53 g. β-N,N-diethylaminopropionic acid diethylamide, boiling point (10 mm. Hg)=123–124° C.

Example 7

50 g. of benzyl di-dimethylamine were dissolved in 150 ml. methylene chloride and treated with 35 g. of ketene cooled to —45° C., and the reaction mixture was then distilled in a vacuum, 7 g. of dimethylacetamide, flowed over in the process. The residuum was purified by recrystallization. In the end 34 g. of cinnamic acid dimethylamide, melting point=95–97° C. were obtained.

The invention claimed is:

1. Process for manufacturing a substance selected from the group consisting of β-aminocarboxylic acid derivatives of the structure

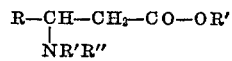

which comprises reacting compounds of the general formula

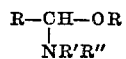

with ketene, where, in the above formulas

R=H, phenyl,
R',R"=alkyl with 1–4 carbon atoms.

2. Process according to claim 1, which is performed at a temperature between —100 and +150° C.

3. Process according to claim 1, wherein the ketene is employed in an excess of 0.1 to 4 mols.

4. Process according to claim 1, in which the reaction is performed in the presence of a catalyst selected from the group consisting of mineral acids and Friedel-Crafts catalyts.

5. Process according to claim 1 in which the reaction is performed in the presence of a neutral catalyst selected from the group consisting of tertiary butyl-titanate and alkali salts of chloracetic acid.

6. Process according to claim 1, in which the reaction is performed in an inert solvent selected from the group consisting of hydrocarbons, hydrocarbon halides, carboxylic acid alkyl esters, silicon tetraalkylates, and ether.

References Cited

March: Adv. Org. Chem., p. 591, published 6-11-68, McGraw-Hill Ram & Hammons; Organic Chem. 2nd ed. 1964, p. 303.

LORRAINE A. WEINBERGER, Primary Examiner

P. J. KILLOS, Assistant Examiner

U.S. Cl. X.R.

260—471 A, 476 R, 486 R, 558 R, 561 N, 561 R